(12) United States Patent
Anderson et al.

(10) Patent No.: US 8,959,118 B2
(45) Date of Patent: Feb. 17, 2015

(54) FILE SYSTEM MANAGEMENT AND BALANCING

(75) Inventors: Eric A Anderson, Mountain View, CA (US); Joseph A Tucek, Palo Alto, CA (US); Jain Nitin, Meerut (IN)

(73) Assignee: Hewlett-Packard Development Company, L. P., Houston, TX (US)

( * ) Notice: Subject to any disclaimer, the term of this patent is extended or adjusted under 35 U.S.C. 154(b) by 124 days.

(21) Appl. No.: 13/460,597

(22) Filed: Apr. 30, 2012

(65) Prior Publication Data

US 2013/0290384 A1    Oct. 31, 2013

(51) Int. Cl.
*G06F 17/30* (2006.01)

(52) U.S. Cl.
USPC .......................................... 707/797; 707/736

(58) Field of Classification Search
CPC ...................................................... G06F 17/30
USPC .................................. 707/797, 736
See application file for complete search history.

(56) References Cited

U.S. PATENT DOCUMENTS

| | | | |
|---|---|---|---|
| 5,930,805 A * | 7/1999 | Marquis | 707/797 |
| 7,103,588 B2 * | 9/2006 | Beck et al. | 707/796 |
| 2001/0042240 A1 * | 11/2001 | Ng et al. | 717/3 |
| 2002/0184231 A1 * | 12/2002 | Baskins et al. | 707/102 |
| 2003/0204513 A1 * | 10/2003 | Bumbulis | 707/100 |
| 2006/0230207 A1 * | 10/2006 | Finkler | 710/240 |
| 2008/0133841 A1 * | 6/2008 | Finkler | 711/144 |
| 2009/0271789 A1 * | 10/2009 | Babich | 718/100 |
| 2009/0327372 A1 * | 12/2009 | Ylonen | 707/206 |
| 2010/0076999 A1 * | 3/2010 | Okazaki et al. | 707/772 |
| 2010/0146003 A1 * | 6/2010 | Bruso et al. | 707/797 |
| 2011/0010461 A1 * | 1/2011 | Lassila et al. | 709/231 |
| 2011/0035728 A1 * | 2/2011 | Janczewski | 717/116 |
| 2011/0238667 A1 * | 9/2011 | Deschler et al. | 707/741 |
| 2011/0246503 A1 * | 10/2011 | Bender et al. | 707/769 |

* cited by examiner

*Primary Examiner* — Dennis Truong
(74) *Attorney, Agent, or Firm* — Dickinson Wright; John Harrop

(57) ABSTRACT

A method for inserting a file in a search tree (B-tree) implemented on a file system, includes: (a) in response to a current node being a root node or an internal node, determining a child node; (b) repeating (a) until a leaf node is detected; (c) in response to a number of leaf nodes at a level of the leaf node exceeding an upper limit of files or a number of child nodes of a current node exceeding an upper limit of sub-directories, balancing the level of the leaf node or child nodes; and (d) inserting the file at the level of the leaf node.

17 Claims, 6 Drawing Sheets

FILE SYSTEM MANAGEMENT AND BALANCING

BACKGROUND

File system performance may degrade if a large amount of files are stored within a single directory. In general, files may be distributed across multiple directories and sub-directories. However, some file systems place a limitation on the number of sub-directories within a directory and/or a number of files within each directory. Even if the number of files to be stored is known, a solution to optimally sort a file system would be limited to the known number of files, and thus, may prevent scaling of the file system based on a change in file numbers to be sorted.

While reading a directory on a file system, files may be returned in random order. For example, to list the files starting with the prefix "foo," a complete directory is read. If the directory contains a small number of files, this solution would be sufficient, but for a directory with a large number of files, the process may take a significant amount of time.

DESCRIPTION OF THE DRAWINGS

The detailed description refers to the following drawings in which like numerals refer to like items, and in which.

DETAILED DESCRIPTION

Disclosed herein are a method and apparatus for storing and managing files in a file system. The method and apparatus disclosed herein store and/or manage files in a data structure, for instance, in a form similar to a B-tree data structure, in a file system in a manner that substantially overcomes at least some of the drawbacks associated with conventional file storage and organization techniques, such as delays associated with a mandatory issuance of a write lock. A B-tree is a tree data structure that may be used to store sorted key+value pairs. As used herein, "B-tree" also means B+tree, B*tree, and other balanced tree data structures that maintain strict height balance and with node sizes above two which vary between a hard maximum and minimum of half the max or greater in the B-tree's persistent form. A file system incorporating a modified B-tree data structure, as disclosed herein, allows for a node to overflow the maximum. A hard maximum is a limit of a size of a B-tree (or node of a B-tree) that is not exceeded. Unlike the hard limits (or maximum) on existing well known B-trees, the herein disclosed modified B-tree allows the node size limits to be violated when convenient. The data structures disclosed herein accommodate large number of files in a single logical directory. The method and apparatus accommodate a large number of files while maintaining a height of a B-tree data structure at a very low level by using different ranges for numbers of directories and files. In addition, the method and apparatus avoid frequent re-balancing of a B-tree data structure, to balance only the current node, and to avoid taking lock from root level, and thus to increase performance of the B-tree data structure.

Figure 1:
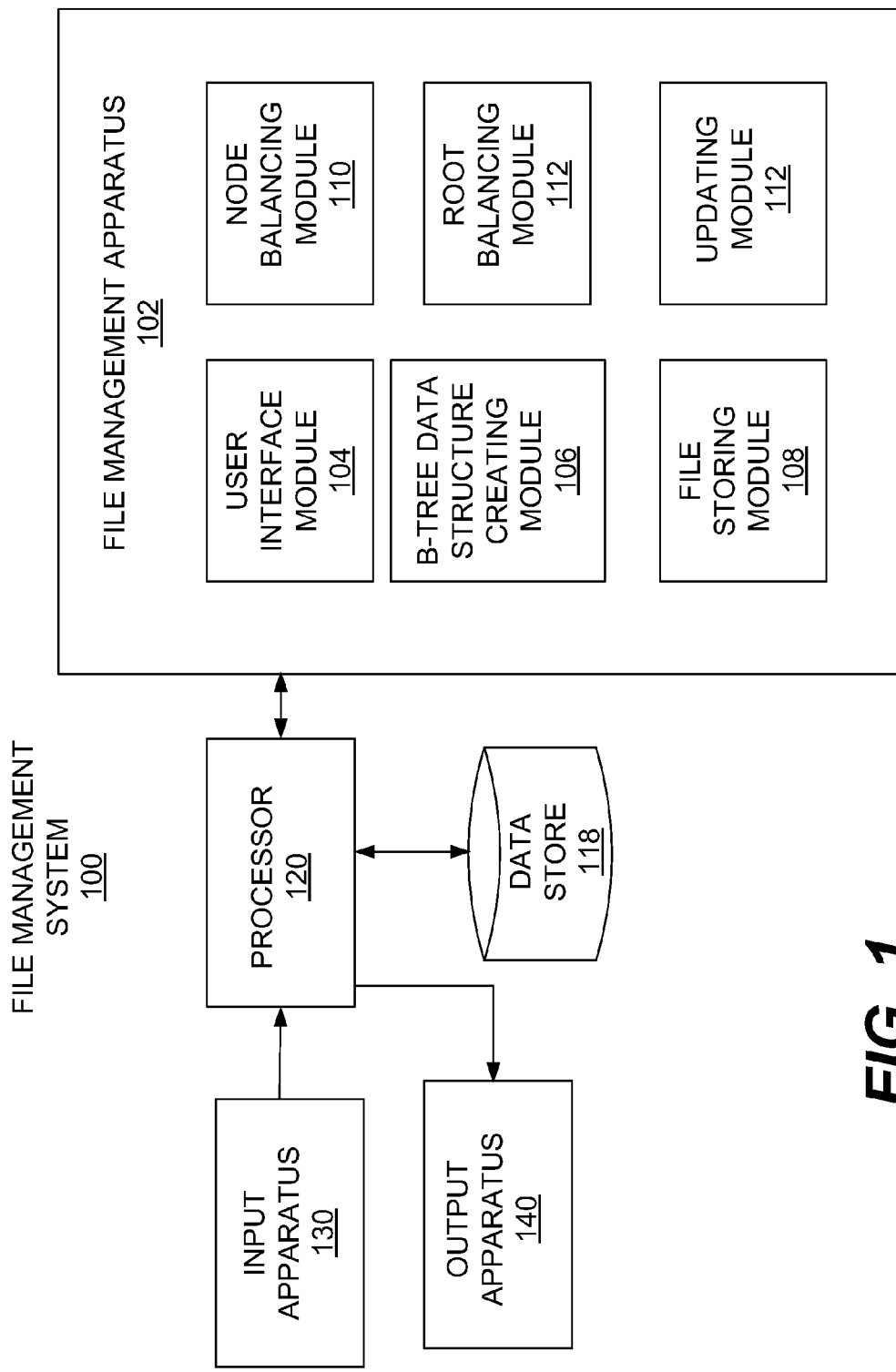
FIG. 1 illustrates a block diagram of an embodiment of a file management system.

FIG. 1 is a block diagram of an example file management system. The diagram of FIG. 1 represents a generalized illustration and other components may be added or existing components may be removed, modified or rearranged without departing from a scope of the file management system. In FIG. 1, file management system 100 includes a file management apparatus 102, a processor 120, an input apparatus 130, an output interface 140, and a data store 118. The processor 120 implements and/or executes the file management apparatus 102. In an example, the file management system 100 may include a computing device and the file management apparatus 102 may include an integrated and/or add-on hardware component of the computing device. As another example, the file management apparatus 102 may include a computer readable storage device (not shown) upon which is stored computer programs that the processor 120 executes.

As further shown in FIG. 1, the processor 120 receives an input from an input apparatus 130. The input apparatus 130 may include, for example, a user interface through which a user may access data, such as, objects, software, and applications that are stored in the data store 118. In addition, or alternatively, a user may interface with the input apparatus 130 to supply data into and/or update previously stored data in the data store 118. The input apparatus 130 may include a user interface through which a user may access versions of the data stored in the data store 118, as outputted through the output interface 140.

The file management apparatus 102 builds and/or updates a data structure stored in a memory, such as, the data store 118 or a persistent memory, such as a hard disk. The data structure, which may be a B-tree data structure, includes elements that enable files to be stored and automatically accessed and updated. Specifically, the file management apparatus 102 builds the data structure in a manner that requires less restructuring and fewer locks. The file management apparatus 102 accommodates a large number of files in a single logical directory and lists files in the file system such that the time taken to list the files is proportional to the number of files returned.

As discussed in greater detail below, in the B-tree structure, leaf nodes may be assigned to files, and internal nodes may be assigned to directories. Internal nodes (directories) may be assigned numbers (ex. 1, 2, 3, . . . ), and each node may contain an index file to map various sub-directories and to a range of files associated with each sub-directory. For example, an index file may contain the following entries '1:'a-m' and '2:n-z'. In the example provided, files associated with a key value starting with a letter in the range 'a-m', will be found in sub-directory 1, with files starting with a key value in the range 'n-z', will be found in sub-directory 2. As used herein, a key value refers to a name of a file, while a key refers to a directory or sub-directory. Thus, by reading the index file, the file management system 100 may determine a child node to traverse into in order to search for a given file.

The B-tree data structure may have a separate limit for targeting a number of child nodes in internal nodes versus in leaf nodes. Some file systems can store more files in a directory than sub-directories in a directory. By having different limits for the number of files and directories, the height of the B-tree data structure may be reduced. Unlike current B-trees each node in the B-tree data structure does not have a fixed maximum size, but instead has a soft lower and upper limit around the target for the number of child nodes. As used herein a soft limit refers to a limit that, when reached, may prompt an action, such as an optimization if the file system may perform an optimization. However, if the file system is unable to perform an optimization (e.g. because the file system would cause a lock conflict), this action may be deferred to a later time. Thus, by providing soft limits, if a node requires balancing, the entire B-tree data structure is not locked. When the B-tree data structure is being traversed to perform an insertion, child nodes may be balanced. If the node is approaching the bounds, then the node may be split or merged if these actions are capable of being performed. Thus, if a write lock is not available, the balancing may be performed at a later stage. Further, by providing a localized balancing for each internal node, the file management system 100 is not required to provide write locks for every node of B-tree data structure.

The file management apparatus 102 may store the built/updated data structures in the data store 118, which also may store the objects. In an example, the data store 118 may include a non-volatile byte-addressable memory, such as, battery-backed random access memory (RAM), phase change RAM (PCRAM), Memristor, a hard disk, and a flash memory. In addition, or alternatively, the data store 118 may include a device to read from and write to external removable media, such as a removable PCRAM device. Although the data store 118 is shown as being internal or attached to the file management system 100, in an alternative the data store 118 may be remotely located from the file management system 100. In this example, the file management system 100 may access the data store 118 through a network connection such as the Internet.

As further shown in FIG. 1, the file management apparatus 102 includes a user interface module 104, a B-tree data structure creating module 106, a file storing module 108, a node balancing module 110, a root balancing module 112, and an updating module 114. The modules 104-114 may be software modules, hardware modules, or a combination of software and hardware modules. Thus, the modules 104-114 may be implemented with circuit components. Alternatively, the modules 104-114 may be implemented as software code stored on a non-transitory computer readable storage medium, which the processor 120 may execute. As such, in one embodiment, the file management apparatus 102 includes a hardware device, such as, a computer, a server, and a circuit. In another embodiment, the file management apparatus 102 includes a computer readable storage medium upon which software for performing the functions of the modules 104-114 is stored. The various functions that the file management apparatus 102 performs are discussed in greater detail below.

Figure 2:
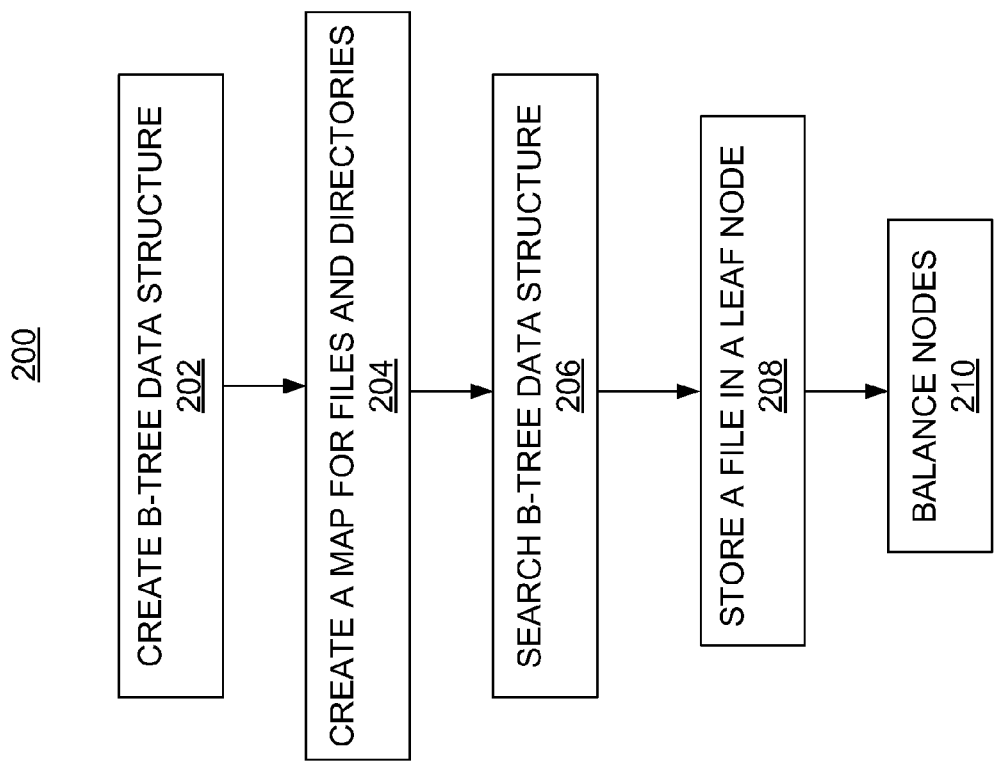
FIG. 2 is a flow diagram of an example method for managing a file in a file system.
Figure 3:
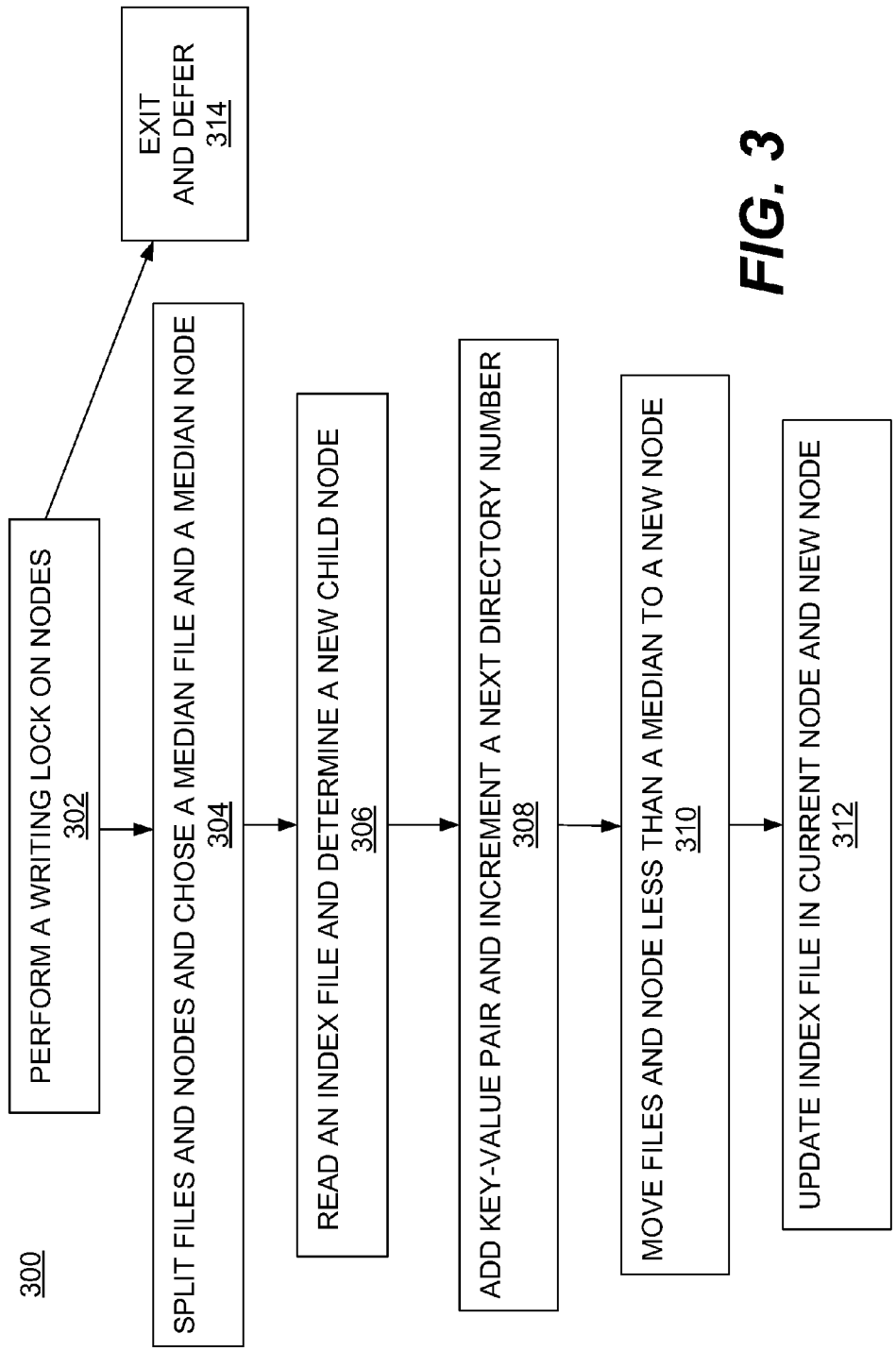
FIG. 3 is a flow diagram of an example method for balancing a node.
Figure 4:
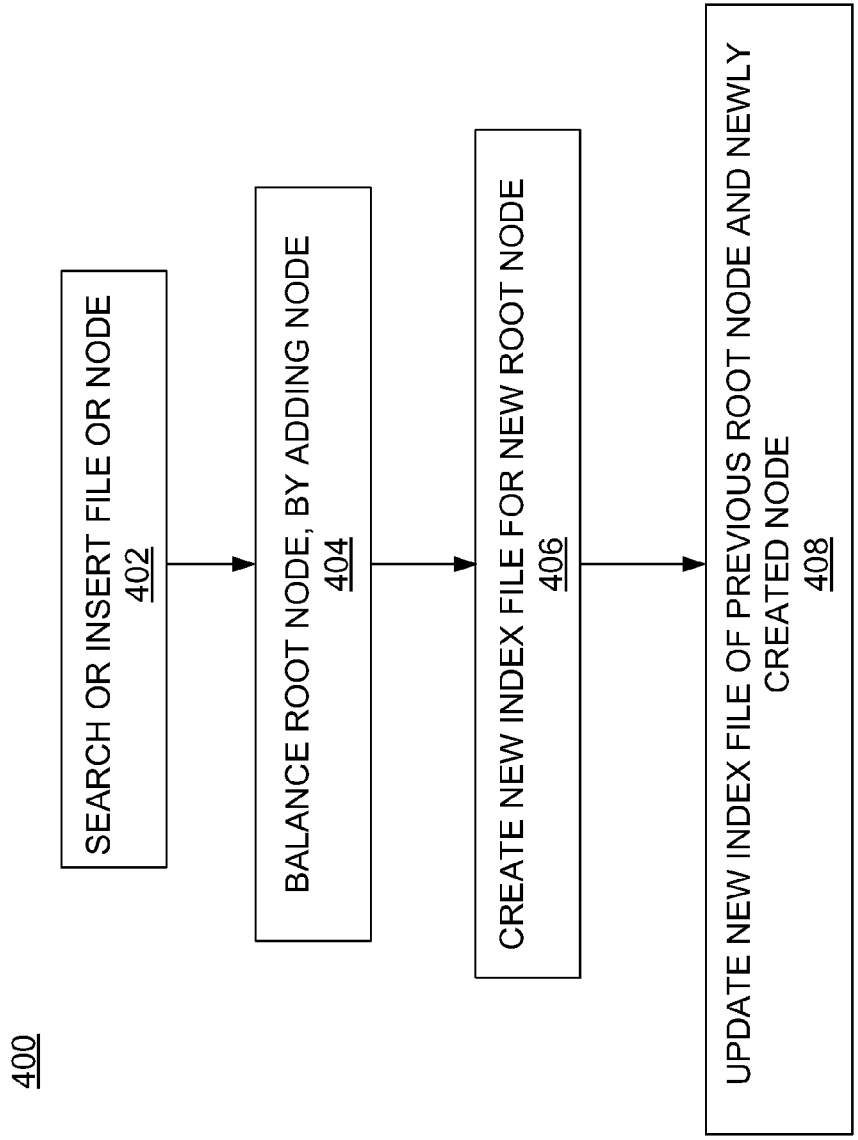
FIG. 4 is a flow diagram of an example method for balancing a root node.

Various methods by which the modules 104-114 of the file management apparatus 102 may be implemented are described in greater detail with respect to FIGS. 2, 3 and 4, which are flow diagrams of example methods 200, 300, 400, and 500 for management of a file in a file system. The methods 200, 300, 400, and 500 represent generalized illustrations, and other aspects may be added or existing aspect may be removed, modified or rearranged without departing from the scope of the methods 200, 300, 400 and 500.

The descriptions of the methods 200, 300, 400 and 500 are made with particular reference to the file management apparatus 102 shown in FIG. 1. However, the methods 200, 300, 400 and 500 may be implemented in an apparatus that differs from the file management apparatus 102 without departing from the scope of the methods 200, 300, 400 and 500.

FIG. 2 is a flow diagram of an example method for management of a file in a file system. In FIG. 2, at block 202, a B-tree data structure for a plurality of files and a plurality of directories is created, for instance, by the B-tree data structure creating module 106. The created B-tree data structure includes leaf nodes, internal nodes, and a root node.

At block 204, a map for the files and the directories is created, and the map may be stored stored in an index file, or alternatively mapped by another method, such as a UTF-8 mapping method. Each node may have an index file associated therein. In an example, each of the leaf nodes corresponds to each of the files, and each of the internal nodes corresponds to each of the directories of the file system.

At block 206, if a specific file is requested to be inserted into the B-tree data structure, the B-tree data structure creating module 106 searches the B-tree data structure beginning at the root node using the index file to determine at which of the leaf nodes to store the file. In choosing the appropriate path to traverse to, the B-tree data structure creating module 106 may use a key name assigned to the specific file to be inserted. Each node may be recursively traversed based on the nodes identified in the respective index file. Thus, based on the current nodes index file, a child node to traverse to may be determined until a node containing leaf nodes is reached.

At block 208, if a node containing leaf nodes is reached, the file storing module 108 may insert the file as a leaf node if the number of leaf nodes at a current level of the node containing the leaf nodes is fewer than a soft upper limit of number of files, and if a write lock is available. At block 208, a system or user may wait for the write lock to become available. Alternatively, at block 208, if a lock is not available, an operation to insert the leaf node may be blocked.

At block 210, if determined at block 208 that a soft upper limit of files is reached by the insertion of the file to be inserted, the node balancing module 110 and/or by the root balancing module 112 balances the node (or level) containing the leaf nodes. More specifically, the index file is read and a number of the child nodes is counted, and the current internal node is balanced. In this way, an internal node may be balanced. In the example provided above, a level of a node containing leaf nodes is balanced based on reaching a soft upper limit; however, a level of a node containing internal nodes (i.e. representing sub-directories) may also be balanced by the node balancing module 110 and/or by the root balancing module 112. A specific example of balancing an internal node is described in detail below.

FIG. 3 is a flow diagram of an example method for balancing a node. As such, the method 300 may represent a more detailed description of the method 210 in FIG. 2, by which the B-tree data structure is stored in the data store 118. With reference to the method 300 in FIG. 3, at block 302, a writing lock on a parent node and a current internal node is performed. Here, the parent node is an upper level internal node of a current internal node. As stated above, in certain operations, a write lock may not be possible. Thus, the method 300 may instead exit and defer the balancing to a later time.

At block 304, the files of the leaf nodes are split into two parts in the current internal node such that a median file or a median node can be chosen. Otherwise, child nodes of the internal nodes may be split into two parts in the current internal node, with a median file or a median node chosen based on the split.

At block 306, the index file is read in the parent node and a range associated with the new child node to be created is determined.

At block 308, a key and a value pair is added in the index file in the parent node with the key as a label associated with the new child node and the value as a range associated with the new node. In addition, the next directory number is incremented by one (1). For example, if the index file previously had entries for two internal nodes, such as node 1 with a range of 'a-m' and node 2 with a range of 'n-z', and based on the above described blocks, a new index file of the parent node may have the following new key-value pairs: node 1 with a range of 'a-g', node 2 with a range of 'n-z' and node 3 with a range of 'h-m'. In this example, a median of 'g' is introduced between node 1 and node 3, to differentiate between associated files.

At block 310, the plurality of files and nodes that fall within the newly created node are moved to the newly created node. In the above example, a range is used associated with the newly created node. Alternatively, a specific file (i.e. leaf node) or sub-directory (i.e. internal node) also may be used as a cutoff or median to determine insertion of a new file, or balancing of a node. As used herein, a median file may refer to a file that indicates a bound. Thus, files that are either labeled alphabetically or numerically below or at the median file may be associated with one node, while files that are above the median may be associated with another node.

Finally, at block 312, if the current node is an internal node, and a new node has been created for purposes of balancing, the index file in the current node is updated, and an index file in the new node is created, for instance, by the updating module 114. Block 312 may be implemented in response to receipt of an instruction to store, update and/or access a data structure. The instruction may include an instruction to update the B-tree data structure in response to the file management apparatus 102 receiving a new object or node to be included in the B-tree data structure.

FIG. 4 is a flow diagram of an example method for balancing a root node.

In FIG. 4, method 400 begins at block 402, where, if a file or node is searched for or requested to be inserted, as similarly described in method 300, and a determination is made that the root requires balancing, the root directory may be balanced, for instance, by the root balancing module 112. A root directory may refer to the top most node of a constructed B-tree data structure.

At block 404, a second node is created based on the balancing. For example, the ranges associated with the root node are divided into plural categories. The second node, i.e., the created node, corresponds to a determined threshold, such as a median. If a node or a file falls within a first range, the node or file is associated with the first node. Otherwise, if the node or file is greater than the determined threshold, the node or the file is associated with the second node.

At block 406, a new index file is created based on the newly created nodes of block 404, and a first key-value pair, as well as a second key-value pair, associated with the original root node and each new node respectively, are added. In one embodiment, the first of the key and the value pair includes the key as median and the value as 1. The second of the key and the value pair includes the key as MAX and the value as 2. The new index file is associated with a new root node.

At block 408, the index files associated with the first node and the second node are updated, if the first node and the second node are internal nodes.

Figure 5:
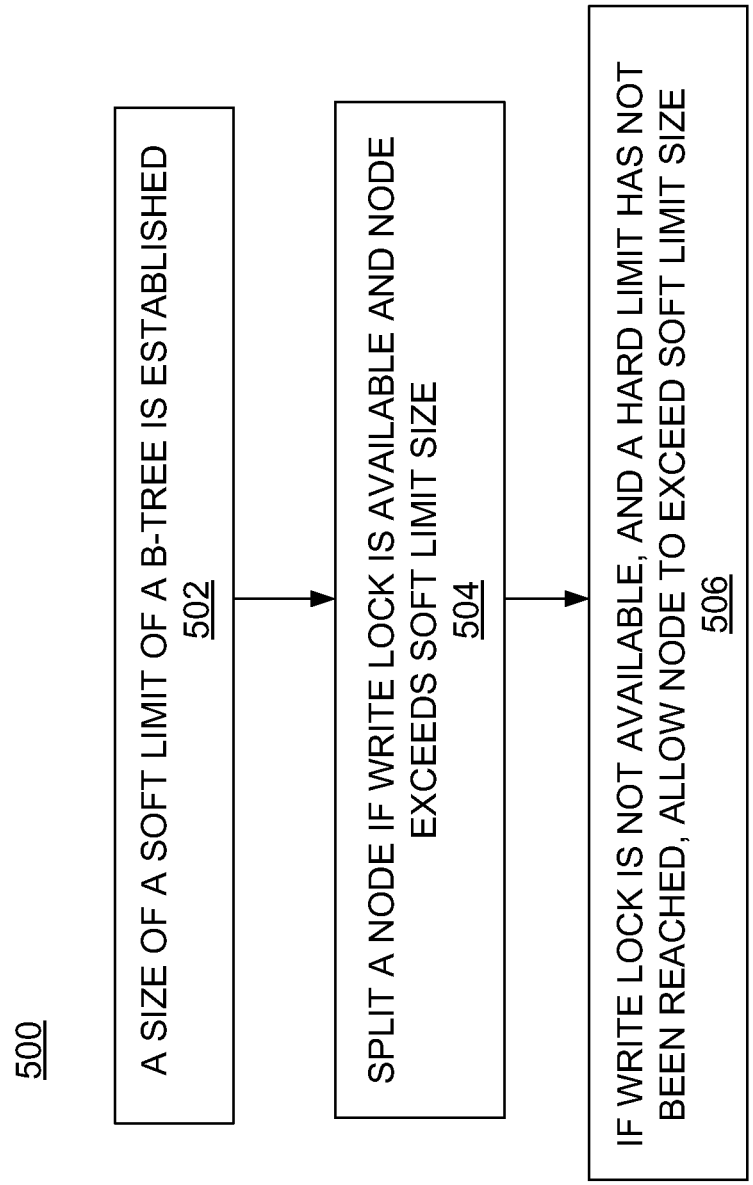
FIG. 5 is a flow diagram of an example method for maintaining a B-tree.

FIG. 5 is a flow diagram of an example method for maintaining a B-tree. Method 500 begins at block 502, a soft limit on a maximum size of a node of the B-tree is established. At block 504, the node is split in response to a size of the node exceeding the soft limit and not reaching a previously established hard limit of each B-tree node, and a write lock being currently available for a parent node of the node. At block 506, in response to the write lock on the parent node not being available, the size of the node is allowed to exceed the soft limit.

Some or all of the operations set forth in FIGS. 2-5 may be contained as a utility, program, or subprogram, in any desired computer readable storage medium. In addition, the operations may be embodied by computer programs, which can exist in a variety of forms both active and inactive. For example, they may exist as software program(s) of instructions in source code, object code, executable code or other formats. Any of the above may be embodied on a computer readable storage medium, which include storage devices.

Exemplary computer readable storage media include conventional computer system RAM, ROM, EPROM, EEPROM, and magnetic or optical disks or tapes. Concrete examples of the foregoing include distribution of the programs on a CD ROM or via Internet download. Any electronic device capable of executing the above-described functions may perform those functions enumerated above.

Figure 6:
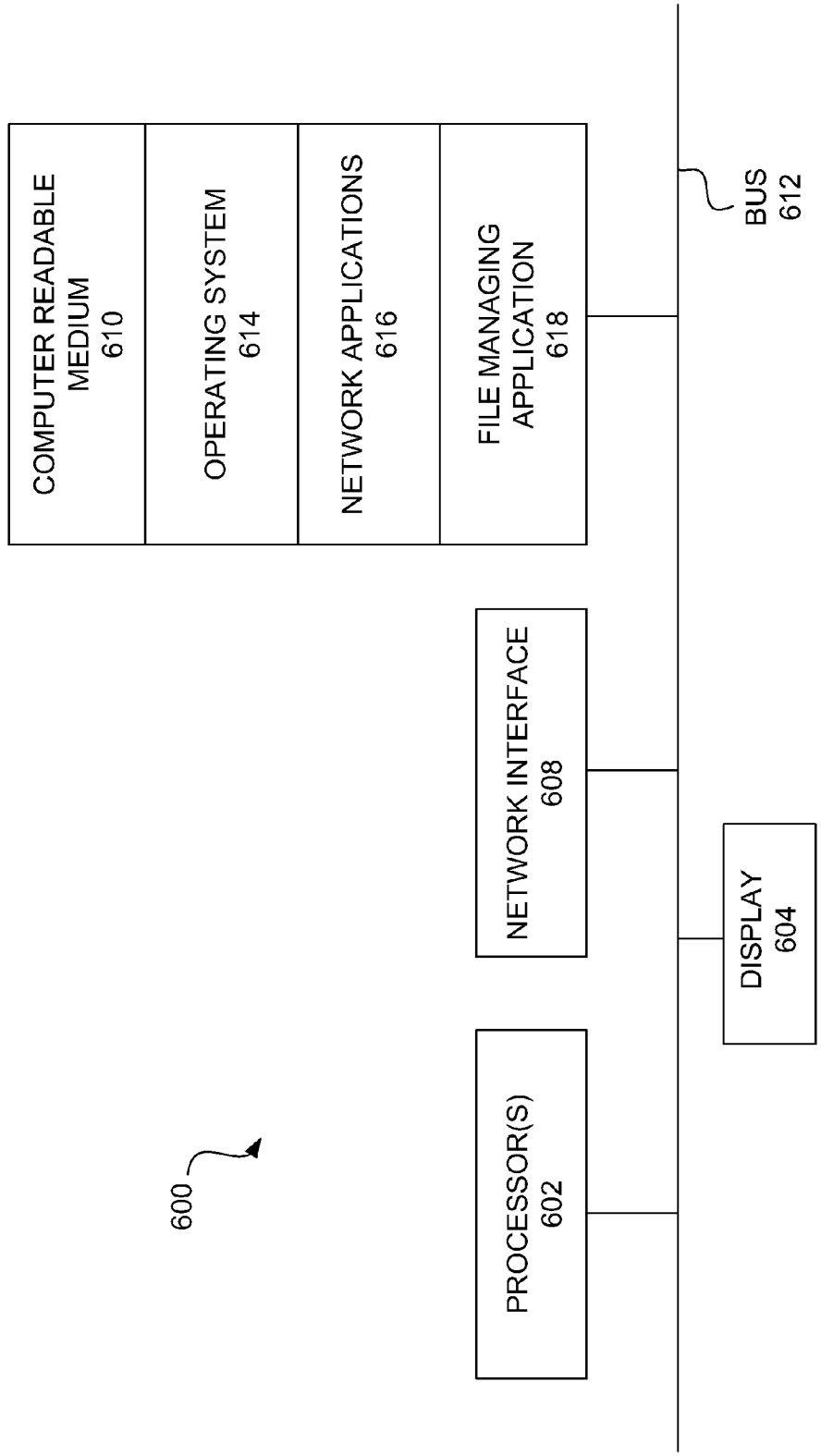
FIG. 6 is a block diagram of an example computing device, which may be employed as a platform for implementing or executing the methods of FIGS. 2-5.

Referring to FIG. 6, a computing device 600 is shown, which may be employed as a platform for implementing or executing the methods shown in FIGS. 2, 3, 4 and 5. The illustration of the computing device 600 is a generalized illustration and the computing device 600 may include additional components and some of the components described may be removed and/or modified without departing from a scope of the computing device 600.

The device 600 includes processors 602, such as a central processing unit; display devices 604, such as a monitor; network interfaces 608, such as a Local Area Network (LAN), a wireless 802.11x LAN, a 3G mobile WAN or a WiMax WAN; and computer-readable mediums 610. Each of these components is operatively coupled to buses 612. For example, the bus 612 may be an EISA, a PCI, a USB, a FireWire, a NuBus, or a PDS.

The computer readable medium 610 may be any suitable medium that participates in providing instructions to the processor 602 for execution. For example, the computer readable medium 610 may be non-volatile media, such as an optical or a magnetic disk; and volatile media, such as memory The computer readable medium 610 may also store other software applications, including word processors, browsers, email, Instant Messaging, media players, and telephony software.

The computer-readable medium 610 may also store an operating system 614; network applications 616; and a file management application 618. The operating system 614 may be multi-user, multiprocessing, multitasking, multithreading, real-time and the like. The operating system 614 may also perform basic tasks such as recognizing input from input devices, such as a keyboard or a keypad; sending output to the display 604; keeping track of files and directories on medium 610; controlling peripheral devices, such as disk drives, printers, image capture device; and managing traffic on the buses 612. The network applications 616 includes various components for establishing and maintaining network connections, such as software for implementing communication protocols including TCP/IP, HTTP, Ethernet, USB, and FireWire.

The file management application 618 provides various software components for building/updating a data structure for a non-volatile memory, as described above. In certain embodiments, some or all of the processes performed by the application 618 may be integrated into the operating system 614. In certain embodiments, the processes may be at least partially implemented in digital electronic circuitry, in computer hardware, firmware, software, or in any combination thereof.

We claim:

1. A method for inserting a file in a search tree (B-tree) implemented on a file system, the method comprising:
   (a) in response to a current node being a root node or an internal node, determining, by a processor, a child node based on the file and an index file associated with the current node or a directory with an encoded name;
   (b) repeating (a) until a leaf node is detected;
   (c) in response to a number of leaf nodes at a level of the leaf node exceeding a first upper limit of files or a number of child nodes of the current node exceeding a second upper limit of sub-directories, balancing, by the processor, the level of the leaf node or child nodes if a write lock is available; and
   (d) inserting, by the processor, the file at the level of the leaf node,
   wherein if the write lock is unavailable, permitting, by the processor, the first and the second upper limits to be further exceeded until the write lock is available at a later time, unless a maximum permitted size of the current node has been reached.

2. The method of claim 1, wherein the index file maps the child node with a range of files associated with the child node.

3. The method of claim 1, wherein the balancing comprises:
   determining a new range associated with the level;
   creating a new node associated with the new range; and
   modifying an index file of a parent node associated with the level based on the new mode and the new range.

4. The method of claim 3, wherein the new range is determined by splitting the level evenly.

5. The method of claim 3, wherein modifying the index file of the parent node comprises:
   modifying a range of a node associated with the level being balanced based on the new range; and
   adding an entry associated with the new node based on the new range.

6. The method of claim 5, wherein a key associated with the new entry is incremented by one of a maximum key of the index file of the parent node prior to modification.

7. The method of claim 1, wherein balancing the level of the leaf node further comprises:
   creating a first range associated with a first new node;
   creating a second range associated with a second new node;
   associating the leaf nodes associated with the first range to the first new node; and
   associating the leaf nodes associated with the second range to the second new node.

8. A file system having a B-tree implemented thereon, comprising:
   an input apparatus implemented at least in hardware including a user interface through which a user may access a B-tree structure stored on a computer readable storage medium, the B-tree structure, comprising:
      a root node associated with at least one child node, and at least one child node associated with at least one leaf node or another child node; and
   a processor to:
      in response to a current node being the root node or an internal node, repeatedly determine a child node based on a file to be inserted and in index associated with the current node or a directory with an encoded name, until a leaf node is detected;
      balance a level at the leaf node or child node in response to a write lock being available;
      insert the file at the level of the leaf node,
   wherein if a number of leaf nodes or the number of child nodes at the level exceed a soft upper limit, the level is still balanced,
   wherein if the write lock is unavailable, permitting the soft upper limit to be further exceeded until the write lock is available at a later time unless a hard limit of a size of the root node has been reached.

9. The system of claim 8, wherein each level of child nodes is associated with an index file, and
   the processor modifies the index file based on the level being balanced.

10. The system of claim 9, wherein if the level is being balanced:
    the B-tree file system creates a new child node associated with a new range;
    an index file of a parent node of the level is modified based on the new child node and the new range; and
    leaf nodes associated with the new range are associated with the new child node.

11. The system of claim 8, wherein if a level is being balanced, the processor locally locks the level being balanced.

12. The system of claim 9, wherein if a new file is inserted, a new leaf node is created and associated with the at least one child node based on a range associated with the at least one child node.

13. A method for maintaining a B-tree having a root node associated with at least one child node, at least one child node associated with at least one leaf node or another child node, comprising
    establishing, by a processor, a soft limit on a maximum size of a node of the B-tree and a hard limit on the maximum size of the node;
    in response to a current node being the root node or an internal node, repeatedly determining, by the processor, a child node based on a file to be inserted and an index file associated with the current node or a directory with an encoded name, until a leaf node is detected;
    splitting, by the processor, the detected leaf node in response to a size of the detected leaf node exceeding the soft limit, and a write lock being currently available for a parent node of the detected leaf node;
    inserting, by the processor, the file at a level of the detected leaf node; allowing, by the processor, the size of the detected leaf node to exceed the soft limit in response to the write lock on the parent node not being available, unless the hard limit has been reached;
    disallowing, by the processor, the size of the detected leaf node to exceed the hard limit.

14. The method of claim 13, further comprising a hard limit on the maximum size of the node.

15. The method of claim 14, further comprising dis-allowing the size of the node to exceed the hard limit.

16. The method of claim 1, wherein if the write lock is unavailable, the level of the leaf node or child nodes is not immediately balanced.

17. The file system of claim 8, wherein the processor determines whether or not to perform balancing the level of the B-tree structure at least on a basis of whether the write lock is available, such that if the write lock is unavailable, then balancing is not immediately performed.

* * * * *